Figure 1:
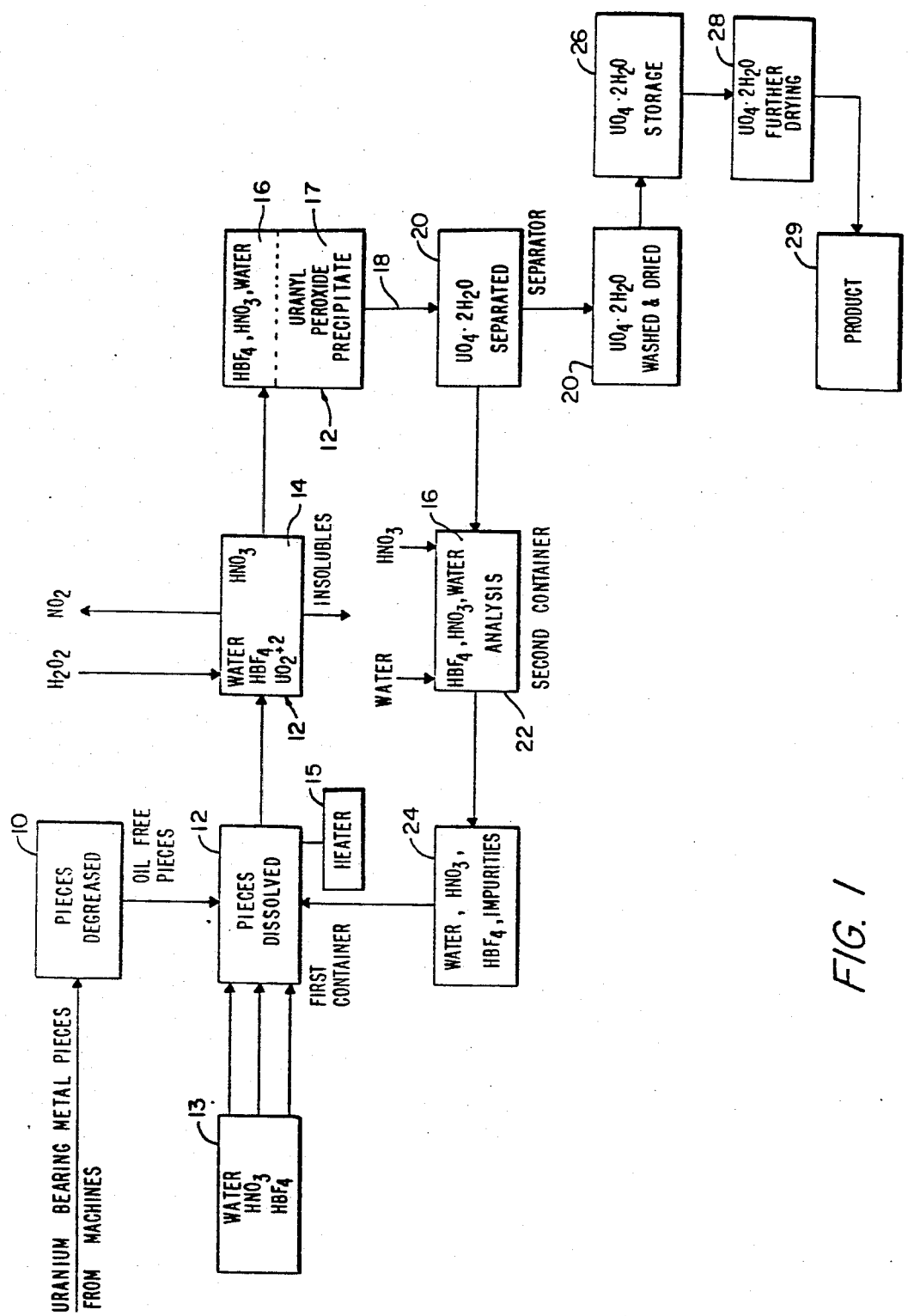

United States Patent [19]

Pollock

[11] Patent Number: 4,793,978

[45] Date of Patent: * Dec. 27, 1988

[54] METHOD AND APPARATUS FOR PRODUCING URANYL PEROXIDE (UO4.2H2O) FROM URANIUM AND URANIUM ALLOY PIECES

[75] Inventor: Eugene N. Pollock, Brookline, Mass.

[73] Assignee: Nuclear Metals, Inc., Concord, Mass.

[*] Notice: The portion of the term of this patent subsequent to Oct. 20, 2004 has been disclaimed.

[21] Appl. No.: 5,083

[22] Filed: Jan. 20, 1987

Related U.S. Application Data

[63] Continuation-in-part of Ser. No. 737,523, May 24, 1985, Pat. No. 4,701,310.

[51] Int. Cl.[4] .............................................. C01G 43/01
[52] U.S. Cl. ..................................... 423/16; 423/260; 423/20
[58] Field of Search ............... 423/258, 259, 260, 254, 423/253, 20, 16

[56] References Cited

U.S. PATENT DOCUMENTS

| | | | |
|---|---|---|---|
| 2,723,181 | 11/1955 | Larson | 423/260 |
| 3,037,840 | 6/1962 | Gregory | 423/260 |
| 4,152,395 | 5/1979 | Börner et al. | 423/260 X |

OTHER PUBLICATIONS

Barkman, Y-MA-YSO Union Carbide Corp, Oakridge, Tenn., Feb. 1, 1966, p. 2.
*Hydrogen Peroxide Precipitation of Uranium* Shaldar, M. et al., Salt Lake City Metallurgy Research Center, Salt Lake City, Utah, Report of Investigations 7931, 1974.

Primary Examiner—John F. Terapane
Assistant Examiner—Susan Wolffe
Attorney, Agent, or Firm—Joseph S. Iandiorio; Douglas E. Denninger

[57] ABSTRACT

A method and apparatus are provided for producing uranyl peroxide ($UO_4.2H_2O$) from uranium-bearing metal pieces. The uranium-bearing metal pieces are dissolved in a first aqueous solution containing nitric acid and between 0.5% and 5.0% fluoboric acid to provide a second aqueous solution which includes uranyl ions ($UO_2^{+2}$) and nitric and fluoboric acids. Hydrogen peroxide is added to the second aqueous solution to precipitate uranyl peroxide out of that solution and provide a third aqueous solution which contains nitric and fluoboric acids. The uranyl peroxide is then separated from the third aqueous solution.

18 Claims, 2 Drawing Sheets

METHOD AND APPARATUS FOR PRODUCING URANYL PEROXIDE ($UO_4.2H_2O$) FROM URANIUM AND URANIUM ALLOY PIECES

CROSS REFERENCE TO RELATED APPLICATION

This application is a continuation in part of U.S. patent application Ser. No 737,523 filed May 24, 1985, now U.S. Pat. No. 4,701,310.

FIELD OF INVENTION

This invention relates to a method and apparatus for producing uranyl peroxide ($UO_4.2H_2O$) from uranium and uranium-bearing metal pieces and to a uranyl peroxide product produced according to that method.

BACKGROUND OF INVENTION

It is presently difficult and expensive to dispose of uranium and uranium alloy (e.g., uranium-titanium, uranium-molybdenum) chips obtained from machining operations. The chips must first be cleaned and dried. Water must be totally removed because water reacts with the uranium leaving hydrogen ($H_2$) which presents an explosive hazard. The uranium and uranium alloy chips may then be compacted into discs to reduce volume and exposed surface area of the chips to oxidation. Groups of these discs are encapsulated in copper cans and crushed again. The copper can encloses the uranium further limiting the surface area of the uranium to oxidation. These crushed copper cans are then buried in designated waste sites.

The above disposal procedures are complex and expensive. Moreover, approximately 50% of the uranium material present at the beginning of the machining operation is buried and lost. Valuable resources are therefore wasted.

SUMMARY OF INVENTION

It is therefore an object of this invention to provide a method and apparatus for producing uranyl peroxide ($UO_4.2H_2O$) from uranium and uranium-bearing metal pieces which enables uranium to be retrieved for reuse from waste metals and machine scraps.

It is a further object of this invention to provide a method and apparatus for producing uranyl peroxide which enables valuable uranium to be used more efficiently and completely and which reduces the expense, waste, and inconvenience associated with the conventional disposal of uranium and uranium alloy waste.

It is a further object of this invention to provide a quick, inexpensive and effective method for recycling uranium-bearing metal pieces which eliminates the need for drying and crushing those pieces.

It is a further object of this invention to provide a method for producing uranyl peroxide which uses fluoboric acid as a catalyst to dissolve uranium and limit the amount of sludge formed.

It is a further object of this invention to provide a method and apparatus for producing uranyl peroxide from uranium-bearing metal pieces which employs a relatively dilute acid.

It is a further object of this invention to provide a method and apparatus for effectively removing metal impurities from uranium and uranium alloy pieces.

It is a further object of this invention to provide a high purity uranyl peroxide product produced according to the method of this invention which may be employed in the manufacture of catalysts as will as other applications.

This invention features a method of producing uranyl peroxide ($UO_4.2H_2O$) from uranium-bearing metal pieces which includes dissolving the uranium-bearing metal pieces in a first aqueous solution containing nitric acid and at least 0.5% but no more than 5.0% fluoboric acid to provide a second aqueous solution which includes uranyl ions ($UO_2^{+2}$) and nitric and fluoboric acids. Hydrogen peroxide is added to the second aqueous solution to precipitate uranyl peroxide out of the second solution and provide a third aqueous solution containing nitric and fluoboric acids. The uranyl peroxide is then separated from the third aqueous solution.

In a preferred embodiment the first aqueous solution may include a concentration of at least 0.5% but no more than 2.0% fluoboric acid. Although dissolution of the uranium pieces may be accomplished with nitric acid concentrates greater than 50%, preferably the first aqueous solution includes no more than a 15% concentration of nitric acid. The first solution may be heated. Insoluble materials in the second solution may be removed and $NO_2$ gas released as the uranium-bearing metal pieces are dissolved in the first solution may be removed from the container through a vent.

To assist with the precipitation the hydrogen peroxide may be stirred into the second solution. The uranyl peroxide precipitate may be separated by centrifuging or by filtering.

Following the separation of the uranyl peroxide precipitate from the third aqueous solution the precipitate may be washed and dried for further reprocessing. The third aqueous solution may be analyzed for acid content and water, nitric acid, and/or fluoboric acid may be added to the third aqueous solution. The third aqueous solution may be used as at least a portion of the first aqueous solution to dissolve successive uranium-bearing metal pieces.

This invention also features a uranyl peroxide product produced according to the method of this invention. Further featured is an apparatus for producing uranyl peroxide from uranium-bearing metal pieces. There are first container means for dissolving uranium-bearing metal pieces in a first aqueous solution which includes nitric acid and fluoboric acid with a 0.5%–5.0% concentration to provide a second aqueous solution which includes uranyl ions ($UO_2^{+2}$) and nitric and fluoboric acids. The container means also receives hydrogen peroxide to precipitate uranyl peroxide out of the second solution and provide a third solution which includes nitric and fluoboric acids. There are separator means connected to the first container means through a first conduit means for receiving the precipitate and the third solution and separating the precipitate from the third solution. Second container means are connected to the separator means through second conduit means for receiving the third solution from the separator means. Third conduit means are connected between the second container means and the first container means and there are means for moving the third aqueous solution through the third conduit means from the second container means to the first container means to reintroduce the third solution in the first solution. Means may be provided for mixing the constituents in the first container means.

Preferably, the apparatus also includes means for removing sludge from the first container means. Means may be provided for heating the first solution. Vent means may be provided for drawing $NO_2$ gas from the vicinity of the first container. Second means may be provided for moving the third solution through the first conduit means. There may be means communicably connected with the separator means for receiving uranyl peroxide. The first container means may include a reaction tank and the separator means may include a filter press.

DISCLOSURE OF PREFERRED EMBODIMENT

Figure 2:
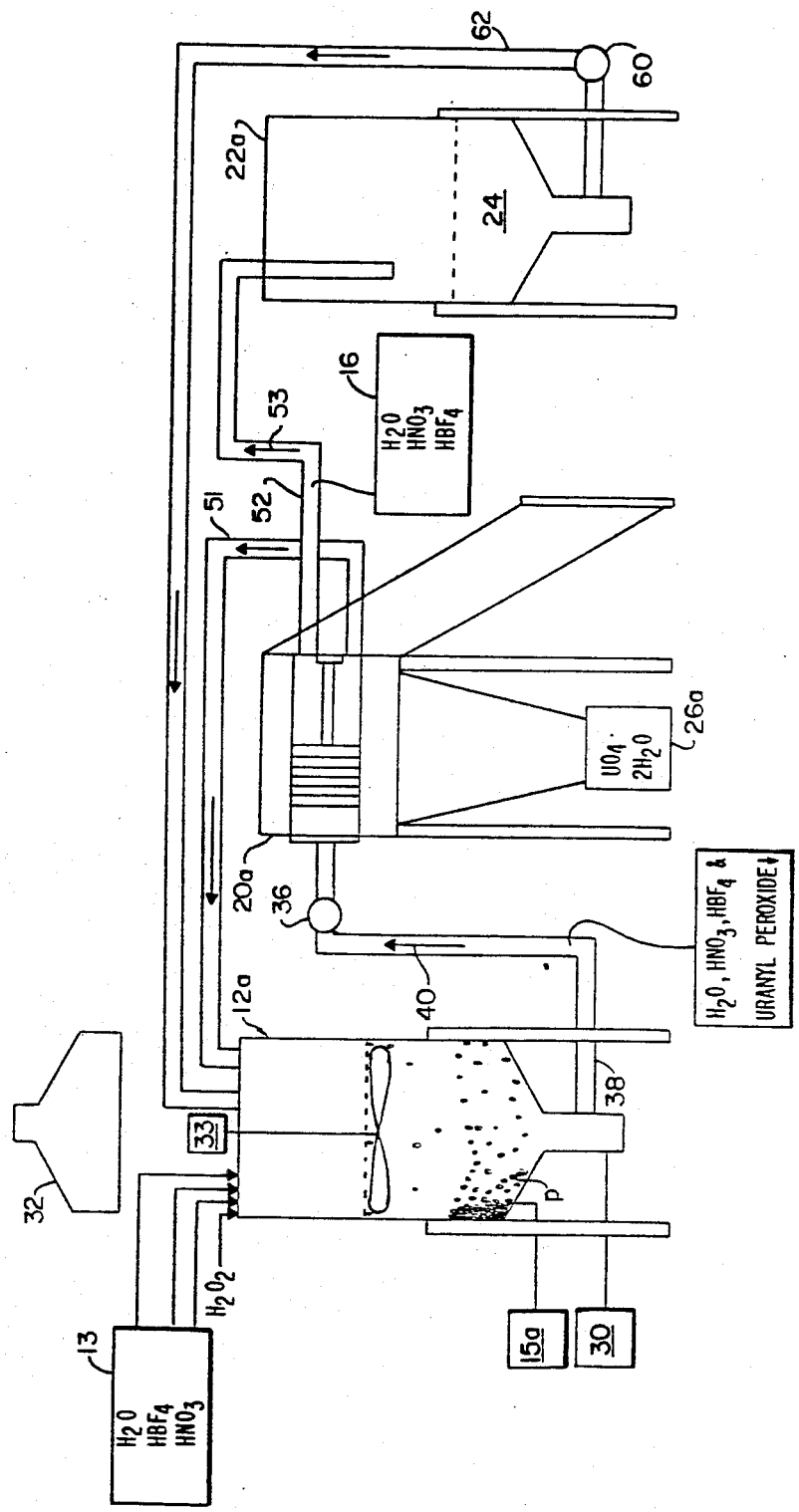

Other objects, features and advantages will occur from the following description of the preferred embodiment and the accompanying drawings, in which:

FIG. 1 is a diagram of a method for producing uranyl peroxide from uranium-bearing metal pieces according to this invention; and FIG. 2 is an elevational, partly schematic view of an apparatus for producing uranyl peroxide from uranium-bearing metal pieces according to this invention.

A method and apparatus for producing uranyl peroxide ($UO_4 2H_2O$) from uranium-bearing metal pieces according to this invention may be accomplished by dissolving pieces of uranium or uranium alloy in a first container holding a first aqueous solution which includes typically 15% or less nitric acid. As the level of nitric acid is increased, for example, above 30%, 40%, 50% or more, the reaction becomes increasingly difficult to control due to its exothermic nature. As a result, a nitric acid concentration of 15% is preferred, but not essential for the practice of this invention. The pieces are usually chips, scraps, or fines formed from the machining or grinding of uranium or uranium alloys such as U-Ti or U-Mo.

To permit the use of reduced concentration of nitric acid a small concentration (e.g., at least 0.5% but no more than 5.0%) of fluoboric acid ($HBF_4$) is included in the first aqueous solution. The fluoboric acid limits the formation of the undesirable sludge and acts as a catalyst to permit the rapid and controlled dissolution of the metal or metal alloy with a more dilute, e.g., 10%, concentration of nitric acid. This reaction is improved even further if the fluoboric acid concentration is maintained at 2.0% or less. The dissolution may be speeded further by heating and/or mixing the first solution as the pieces are added. The pieces dissolve into a second aqueous solution which includes uranyl ions ($UO_2^{+2}$) nitric acid, and fluoboric acid. Alloy metals such as titanium or molybdenum, if present, are also dissolved in the second solution. Insoluble materials such as refractory oxides drop to the bottom of the first container and may be eliminated by bottom draining or coarse filtration. One such apparatus for performing that removal is the JWI Filter Press Model 470. The dissolution of the uranium-bearing pieces also liberates $NO_2$ gas which is vented from the vicinity of the container.

Hydrogen peroxide ($H_2O_2$) is added to the second aqueous solution and uranyl peroxide ($UO_4.2H_2O$) is therefore precipitated out of that solution. To encourage such precipitation the hydrogen peroxide may be stirred into the second solution. A third aqueous solution containing nitric and fluoboric acids is provided and that solution and the uranyl peroxide precipitate it contains are moved, typically through a conduit to separator means for separating the uranyl peroxide from the third aqueous solution. The third aqueous solution is then delivered to a second container through a second conduit wherein the acid content of the third aqueous solution may be analyzed. Water, nitric acid and/or fluoboric acid may be added to the third aqueous solution to bring those constituents to approximately the level of the first aqueous solution. The third aqueous solution, which also includes any metals such as titanium or molybdenum dissolved in the first container, is moved as required through a third conduit from the second container back to the first container where it may be utilized as, or in combination with, the first aqueous solution to dissolve successive loads of uranium-bearing metal pieces.

The uranyl peroxide is washed with for example a 0.05% solution of hydrogen peroxide to reduce impurities and is at least partially dried such as by backflushing with air. It may then be removed from the separator means and stored in drums or similar containers. The wash solution is discharged. Eventually, the uranyl peroxide may be further dried and sold to consumers such as catalyst producers. The uranyl peroxide product is particularly advantageous for use in catalysts in the acrylonitrite industry.

The first container may include a reaction tank. A preferred acceptable tank is a 200 gallon tank made by Perry Products Corp. The separator means may include a press filter such as the JWI Filter Press Model 470, a centrifuge or other such solid/liquid separation apparatus. Typically the second container is a filtrate tank such as the 200 gallon tank manufactured by Perry Products Corp. Conventional pumps may be employed to move the solutions between the containers and separator means.

The following example is provided to illustrate the quantities of materials and chemicals and the times which may be employed in the process of this invention. These values, however, are provided for illustrative purposes only. The process of this invention is limited only by the claims.

The first aqueous solution may include 90 gallons of water, 10 gallons of nitric acid and 0.6 gallons of fluoboric acid. To this solution 100 lbs. of oil-free uranium and/or uranium alloy scrap may be added at a rate which maintains the exothermic reaction temperature between 140°-160° F. The pieces are added and the constituents mixed and/or heated until dissolution is complete. Three gallons of hydrogen peroxide, having a concentration of 50% may then be added to the second aqueous solution. The solution is stirred for 1-2 hours or until the uranyl peroxide ($UO_4.2H_2O$) has completely precipitated out of solution. After separation of uranyl peroxide from the third aqueous solution that solution is analyzed for losses in nitric acid and water. The required amount of each is added to bring the solution to a level of 100 gallons and a 10% concentration of nitric acid. Typically very little fluoboric acid is lost but this constituent may also be replenished if neded. The solution may then be recycled for use in dissolving an additional 100 lbs. of uranium and/or uranium alloy scrap. Recycling may be continued until metal impurities (e.g., Fe, Ni, Cu, Si, Ti and Mo) reach undesirably high levels. Those levels may vary according to the intended uses for the recycled uranyl peroxide. A small amount of the first solution maybe disposed of before it is recycled to maintain the impurity level within the desired limits.

There is shown in FIG. 1 a method for producing uranyl peroxide from uranium-bearing metal chips according to this invention. Machined and lubricated uranium, and/or uranium alloy pieces are introduced into, for example, a Corpane degreaser 10 where they are degreased in freon to remove the lubricant. The oil-free pieces are then introduced into a first container 12 which contains an aqueous solution 13 of nitric acid ($HNO_3$) having a concentration of 15% or less and fluoboric acid ($HBF_4$) having a concentration of 0.5% to 2%. The concentration of fluoboric acid may be selectively increased to as high as 5.0%. The desired temperature range of 140°–160° may be achieved more quickly by employing heater 15 to heat solution 13. The pieces are dissolved in solution 13 to provide a second aqueous solution 14 according to the following equation:

$$U^0 \text{ (metal or alloy)} + 8HNO_3 \xrightarrow{HBF_4} UO_2^{+2} + 2NO_3^- + 4H_2O + 6NO_2$$

Aqueous solution 14 includes water, nitric and fluoboric acids and uranyl and $NO_3$ ions. It also includes dissolved alloy metals such as titanium and molybdenum present in the metal pieces. $NO_2$ gas is liberated by the reaction. Insoluble oxides may be removed from the bottom of container 12. The presence of fluoboric acid prevents the formation of sludge and catalyzes the reaction.

Hydrogen peroxide ($H_2O_2$) is then added to solution 14 within container 12. The hydrogen peroxide reacts with the second solution 14 according to the following formula:

$$UO_2^{+2} + H_2O_2 + 2H_2O \rightarrow UO_4.2H_2O \downarrow + 2H^+$$

This reaction may be encouraged by stirring the hydrogen peroxide into the solution for up to 1–2 hours. Uranyl peroxide 17 is therefore precipitated out of solution 14 to provide a third aqueous solution 16 containing nitric and fluoboric acids. The uranyl peroxide 17 and solution 16 are then delivered as indicated by arrow 18 to separator 20 where the uranyl peroxide is separated from solution 16. Solution 16 is delivered to a second container 22 where its acid and water content are analyzed. The free acid level is typically determined by titration with a standard base (e.g., 0.5 NaOH). The water level is determined by total volume in container 22. Acid and water may be added to bring their respective levels to those of aqueous solution 13. A solution 24 is thereby provided which includes each of the constituents and concentrations of solution 11 with the possible addition of dissolved metal impurities (e.g., titanium, molybdenum).

Following separation from third solution 16 the uranyl peroxide may be washed with dilute hydrogen peroxide in separator 20 to reduce impurities such as Cu, Ni, Fe, Si, Ti, and Mo. The uranyl peroxide is then partially dried by back-flushing with air and is removed from separator 20 and stored as at 26. Subsequently the uranyl peroxide may be dried further at 28 and sold as a product 29.

An apparatus for accomplishing the method of this invention is shown more clearly in FIG. 2. Aqueous solution 13, including nitric and fluoboric acids, and uranium-bearing pieces P are introduced into a reaction tank 12a and pieces P are dissolved in the solution. Variable speed mixer 33 mixes and heater 15a heats solution 13 to speed dissolution of the metal pieces into an aqueous solution which includes uranyl and $NO_3^-$ ions in addition to the nitric and fluoboric acids. Refractory oxides or other undesirable insoluble materials drop to the bottom of tank 12a and are drained or filtered by filter 30. Gaseous $NO_2$ gas is also liberated by the reaction and vented from the vicinity of tank 12a by hood 32.

Hydrogen peroxide ($H_2O_2$) is added to the solution in tank 12a thereby causing uranyl peroxide to precipitate out of the solution. An aqueous solution including nitric and fluoboric acids and uranyl peroxide precipitate is pumped by pump 36 through a conduit 38 in the direction of arrow 40 to a filter press 20a. There the aqueous solution is separated from the uranyl peroxide. The uranyl peroxide may be washed and dried in filter press 20a and then deposited in a storage tank 26a. The aqueous solution 16 is delivered through conduit 52 in the direction of arrow 53 to a filtrate tank 22a. The acid level of the filtrate (e.g., the aqueous solution in tank 22a) is analyzed and water and/or acid are added to bring their levels to those of the first aqueous solution 13. Filtered solution 24 is then pumped as needed by a pump 60 through conduit 62 back to reaction tank 12a where it may be employed to dissolve subsequent batches of uranium-bearing pieces.

The apparatus disclosed is only one example of an apparatus which may be used to practice this invention. This invention is not limited to the illustrated apparatus and may be practiced on various alternative apparatuses.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A method of producing uranyl peroxide ($UO_4.2H_2O$) from uranium-bearing metal pieces comprising:
    dissolving the uranium-bearing metal pieces in a first aqueous solution containing nitric acid and at least 0.5% but no greater than 5.0% fluoboric acid to provide a second aqueous solution which includes uranyl ions ($UO_2^{+2}$) and nitric and fluoboric acids;
    adding hydrogen peroxide to said second aqueous solution to precipitate uranyl peroxide out of said second solution and provide a third aqueous solution containing nitric and fluoboric acids; and
    separating said uranyl peroxide from said third aqueous solution.

2. The method of claim 1 in which said first aqueous solution includes no more than 50% nitric acid.

3. The method of claim 1 in which said first aqueous solution includes no more than 15% nitric acid.

4. The method of claim 1 in which said uranyl peroxide precipitate is separated by centrifuging.

5. The method of claim 1 in which said uranyl peroxide precipitate is separated by filtering.

6. The method of claim 1 in which said hydrogen peroxide is stirred into said second solution.

7. The method of claim 1 further including washing said uranyl peroxide precipitate following its separation from said third aqueous solution.

8. The method of claim 7 in which said uranyl peroxide precipitate is washed with hydrogen peroxide.

9. The method of claim 7 further including drying said washed uranyl peroxide precipitate.

10. The method of claim 1 further including using said third aqueous solution containing nitric and fluoboric acids as at least a portion of said first aqueous solution to dissolve successive uranium-bearing metal pieces.

11. The method of claim 1 further including analyzing the acid content of said third aqueous solution.

12. The method of claim 10 further including adding water to said third aqueous solution following separation of said uranyl peroxide and using said third solution in said first solution to dissolve successive uranium-bearing metal pieces.

13. The method of claim 10 further including adding nitric acid to said third aqueous solution.

14. The method of claim 10 further including adding fluoboric acid to said third aqueous solution following separation of said uranyl peroxide and using said third solution in said first solution to dissolve successive uranium-bearing metal pieces.

15. The method of claim 1 further including removing insoluble materials from said second aqueous solution.

16. The method of claim 1 further including venting $NO_2$ gas released as the uranium-bearing metal pieces are dissolved in the first solution.

17. The method of claim 1 further including heating said first solution to speed dissolution of the metal pieces.

18. A method of producing uranyl peroxide ($UO_4.2H_2O$) from uranium-bearing metal pieces comprising:
dissolving said uranium-bearing metal pieces in a first aqueous solution containing nitric acid and at least 0.5% but no greater than 5.0% fluoboric acid to provide a second aqueous solution containing uranyl ($UO_2^{+2}$) ions and nitric and fluoboric acids;
removing insoluble materials from said second solution;
adding hydrogen peroxide to said second solution to precipitate uranyl peroxide out of said second aqueous solution and provide a third aqueous solution containing nitric and fluoboric acids; and
separating said uranyl peroxide from said third aqueous solution.

* * * * *